3,798,226
3-ACYLAMINO-4-PHENYLQUINOLINES CARRYING A SUBSTITUENT ON THE BENZENE RING
Kanji Meguro, Nishinomiya, Yutaka Kuwada, Ashiya, Teruji Henmi, Amagasaki, and Togo Yamano, Nara, Japan, assignors to Takeda Chemical Industries, Ltd., Osaka, Japan
No Drawing. Filed Apr. 2, 1971, Ser. No. 130,853
Claims priority, application Japan, Apr. 4, 1970, 45/28,850
Int. Cl. C07d 33/56
U.S. Cl. 260—287 R                  11 Claims

ABSTRACT OF THE DISCLOSURE

Compounds of the general formula

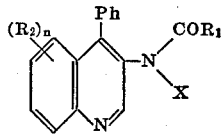

wherein $R_1$ is hydrogen, alkyl, cycloalkyl, alkylene, or aralkyl, such groups being substituted or unsubstituted,
X is hydrogen or an acyl group of the formula —$COR_1$,
$R_2$ is halogen, trifluoromethyl, alkyl, alkoxy, nitro, amino or an acylamino group of the formula —$NHCOR_1$,
n is an integer of 1 to 4, and
Ph is substituted or unsubstituted phenyl are antitrichomonas or antiulcer agents.

---

The present invention relates to novel quinoline derivatives, which have effective antitrichomonas and antiulcer action.

The present inventors have succeeded in synthesizing novel quinoline derivatives and have further found that they have effective antitrichomonas and antiulcer action with extremely low toxicity. The present invention was accomplished on the basis of this finding.

The principal object of the present invention is to provide novel quinoline derivatives useful as medicines such as antitrichomonas agents or antiulcer agents. Another object of the present invention is to provide an industrially feasible method for the production of these novel quinoline derivatives.

The object compounds of the present invention are those represented by the following General Formula I

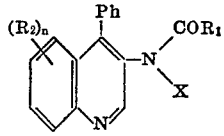

(I)

wherein, $R_1$ stands for hydrogen, alkyl, cycloalkyl, alkylene or aralkyl groups, which are unsubstituted or substituted, X stands for hydrogen, or acyl group represented by the formula —$COR_1$ ($R_1$ has the same meaning as above), $R_2$ stands for halogen, trifluoromethyl, alkyl, alkoxy, nitro, amino or an acylamino group represented by the formula —$NHCOR_1$ ($R_1$ has the same meaning as above) n is an integer of 1 to 4 and Ph is a phenyl group which is unsubstituted or substituted.

In the following, detailed explanation is made of the present invention.

In the General Formula I, the alkyl groups represented by the symbol $R_1$ may be straight or branched chain. The alkylene groups may also be straight or branched chain. The alkyl, alkylene and cycloalkyl groups, contain from 1 to 17 carbon atoms, and those having from 1 to 5 carbon atoms are preferred. Typical examples of the groups are methyl, ethyl, propyl, isopropyl, allyl, butyl, sec-butyl, tert-butyl, pentyl, cyclopentyl, hexyl, cyclohexyl, heptyl, octyl, nonyl, decyl, undecyl, dodecyl, tridecyl, tetradecyl, pentodecyl, hexadecyl, heptadecyl. The aralkyl groups represented by the symbol $R_1$ are, for example, phenyl lower alkyl such as benzyl, phenethyl, phenylpropyl. These alkyl, alkylene, cycloalkyl or aralkyl groups represented by the symbol $R_1$ may be substituted by one or more halogen atom(s) (i.e., chlorine, bromine, iodine, fluorine) in their optional position(s).

The benzene nucleus of the General Formula I is substituted, at optional positions, by one to four members represented by the symbol $R_2$, which are selected from halogen, trifluoromethyl, alkyl, alkoxy, nitro, amino or acylamino group represented by the formula —$NHCOR_1$ (wherein $R_1$ has the same meaning as above). When two or more $R_2$ groups are substituted, they may be same as or different from one another.

The halogen atom represented by the symbol $R_2$ includes chlorine, bromine, iodine and fluorine.

The alkyl group represented by the symbol $R_2$ are preferably lower alkyl having from 1 to 4 carbon atoms (e.g., methyl, ethyl, propyl, isopropyl, butyl, isobutyl, sec-butyl, tert-butyl). The alkoxy groups represented by the symbol $R_2$ are preferably lower alkoxy having 1 to 3 carbon atoms (e.g., methoxy, ethoxy, propoxy, isopropoxy).

The phenyl group represented by the symbol Ph may be substituted, at optional position(s), by one or more member(s) selected from halogen, trifluoromethyl, alkyl, alkoxy, dialkylamino (the alkyl groups being preferably of 1 to 4 carbon atoms), nitro, acylamino group represented by the formula —$NHCOR_1$ and acyloxy group represented by the formula —$OCOR_1$ (wherein $R_1$ has same meaning as above).

The halogen, alkyl, alkoxy, and acylamino have the same meaning as described in regard to the substituents of the benzene nucleus.

The compounds of the General Formula I are produced by reacting a compound represented by the General Formula II

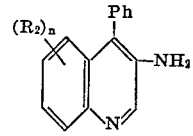

(II)

(wherein, n, $R_2$ and Ph have the same meaning as above) with an acylating agent, and, if desired, by further reduction when $R_2$ is nitro, and/or by further acylation when $R_2$ is amino.

As the acylating agent of the present invention, any one which can introduce one or two acyl group(s) into the amino group at the 3-position of the Compound II may be employed. Typical examples of these acylating agents are a carboxylic acid represented by the General Formula III $$R_1—COOH \qquad (III)$$

(wherein $R_1$ has the same meaning as above), its acid halide (e.g. acid chloride, bromide), acid anhydride, ester (e.g. alkyl esters such as methyl-, ethyl-, propyl ester), activated ester (e.g. p-nitrophenyl ester, pentachlorophenyl ester) and mixed anhydride such as one with alkyl chloroformate etc.

The reaction is generally conducted in a suitable inert solvent, such as benzene, chloroform, tetrahydrofuran, dimethylformamide, pyridine and water, but the acylating agents per se can be used as the solvent, if desired. The addition of an acid acceptor such as pyridine, triethylamine, sodium acetate, alkali metal hydroxides, alkali metal carbonates, alkali metal bicarbonates, etc. to the reaction system may often give good results.

The reaction conditions such as temperature, time or the amount of the acylating agents vary with other factors such as the kind of the solvent used, an acylating agent, or the starting Compound II, and generally, the reaction is conducted at about 0° C. to about the boiling point of the solvent used.

According to the above-mentioned acylation, usually the corresponding monoacylated compound represented by the General Formula I wherein X is hydrogen atom is produced. But, under more drastic reaction conditions such as high temperature, prolonged reaction time, a large excess amount of the reagent, the corresponding diacylated compound represented by the General Formula I wherein X is an acyl group represented by the formula —$COR_1$ ($R_1$ has the same meaning as above) is produced.

Furthermore, if desired, reduction of a Compound I wherein $R_2$ is a nitro group gives a Compound I wherein $R_2$ is an amino group and acylation of a Compound I wherein $R_2$ is an amino group gives a Compound I wherein $R_2$ is an acylamino group represented by the formula —$NHCOR_1$ ($R_1$ has the same meaning as above).

This reduction is conducted using per se conventional means (e.g. catalytic reduction, reduction with a metal such as Zn, Fe, Ni, Sn).

The object Compound I is easily isolated or purified by the per se known means (e.g. extraction, distillation, recrystallization, chromatography, etc.).

The Compound II, the starting compound of the present invention, may be produced by subjecting a compound represented by the General Formula IV

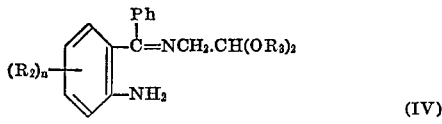

(wherein $R_3$ stands for a lower alkyl group, and $n$, $R_2$ and Ph have the same meaning as above) to ring closure reaction in the presence of alcoholic hydrogen chloride under reflux. The Compound II also may be produced in the manner described in Journal of Chemical Society, 3914 (1953).

Thus obtained Compounds I have effective antitrichomonas and antiulcer actions, with extremely low toxicity. With regard to antiulcer action, the compounds can treat effectively ulcers of various types (e.g. gastric ulcer, duodenal ulcer, intestinal ulcer, etc.) and, furthermore, the compounds can prevent ulcers, particularly those caused by anti-inflammatory agents, and therefore, it is recommended to administer anti-inflammatory agents (e.g. phenylbutazone, Indomethacine, Ibufenac) together with the present compound in order to prevent ulcers caused by the anti-inflammatory agents.

Therefore, the Compouds I are useful as medicines such as antitrichomonas agent, antiulcer agent or preventive medicines against ulcers, particularly, those caused by anti-inflammatory agents.

When the Compounds I are employed as antiulcer agents and/or medicines for treating or preventing ulcers, particularly those caused by anti-inflammatory agents, or employed as antitrichomonas agents and/or medicines for treating trichomoniasis, these compounds are administered per se or in form of a pharmaceutically acceptable composition in admixture with suitable and conventional carriers or adjuvants.

The pharmaceutical composition may take the form of tablet or vaginal tablet, granules, powders, capsules, suppository or ointment, and may be administered orally or parenterally.

As an antiulcer agent or preventive medicine against ulcers, particularly, those caused by anti-inflammatory agents usual daily doses of the present compounds lie in the range of about 50 mg. to about 1 g. per adult human.

And as an antitrichomonas agent, usual daily doses of the present compounds lie in the range about 10 mg. to about 1 g. per adult human.

For the further explanation of the present invention, the following references and examples are given, wherein the word "part(s)" is based on weight unless otherwise noted and the relationship between "part(s)" and "volume part(s)" corresponds to that between "gram(s)" and "milliliter(s)."

REFERENCE 1

A solution of 1 part of 2-amino-5-chloro-α-phenyl-benzylidenaminoacetaldehyde diethyl acetal in 10 volume parts of 10 weight percent ethanolic hydrogen chloride is refluxed for 1 hour.

The reaction mixture is concentrated, and the resulting crystals are collected by filtration. The crystals are washed with acetone, and recrystallized from ethyl alcohol-ethyl ether to give 3-amino-6-chloro-4-phenylquinoline hydrochloride as yellow crystals melting at 248 to 249° C. Treatment of the hydrochloride with 10 weight percent ammonium hydroxide, followed by recrystallization from ethyl ether-n-hexane gives 3-amino-6-chloro-4-phenylquinoline as colorless needles melting at 161 to 162° C.

REFERENCE 2

2-amino - 5 - nitro-α-phenylbenzylidenaminoacetaldehyde diethyl acetal is treated in a similar manner to the above Reference 1, whereupon 3-amino-6-nitro-4-phenylquinoline hydrochloride is obtained as fine crystals melting at 235 to 242° C. Treatment of the hydrochloride with 10 weight percent ammonium hydroxide, followed by recrystallization from benzene gives 3-amino-6-nitro-4-phenylquinoline as yellow flakes (with ½ mole of benzene of crystallization) melting at 155 to 157° C.

REFERENCE 3

(1) To a solution of 5.2 parts of 2-amino-5-chloro-4'-methoxy-benzophenone in a mixture of 100 volume parts of acetone and 40 volume parts of 20 weight percent hydrochloric acid is added 2.3 parts of methazonic acid.

The mixture is kept standing at room temperature overnight and the resulting crystals are collected by filtration. Recrystallization from acetone gives 5-chloro - 2 - (2-nitroethylidenamino) - 4' - methoxybenzophenone as yellow needles melting at 209 to 210° C. (decomposition).

(2) A solution of 5.2 parts of 5-chloro-2-(2-nitroethylidenamino) - 4' - methoxybenzophenone in mixture of 8 volume parts of 2 M-sodium methylate in methanol and 52 volume parts of methyl alcohol is kept standing at room temperature for 2 hours. The solvent is removed and water is added to the residue. The resulting crystals are recrystallized from ethyl alcohol to give 6-chloro-3-nitro - 4 - (p - methoxyphenyl)quinoline as crystals melting at 168 to 169° C.

(3) A mixture of 4.6 parts of 6-chloro-3-nitro-4-(p-methoxyphenyl)quinoline, 90 volume parts of concentrated hydrochloric acid and 10.5 parts of stannous chloride is heated at 95 to 100° C. for 1 hours. The reaction mixture is neutralized with sodium hydroxide and extracted with chloroform. The chloroform layer is washed with water, dried over sodium sulfate and then evaporated. The residual crystals are recrystallized from ethyl acetate to give 3-amino-6-chloro - 4 - (p-methoxyphenyl)quinoline as colorless prisms melting at 167 to 168° C.

After a similar manner to the above references, the following starting compounds are produced:

3-amino-6-bromo-4-phenylquinoline; M.P. 177 to 178° C.
3-amino-6-iodo-4-phenylquinoline; M.P. 200 to 201° C.
3-amino-6-chloro-4-(2-chlorophenyl)quinoline; M.P. 157 to 158.5° C.
3-amino-6-methyl-4-phenylquinoline; M.P. 135 to 136° C.
3-amino-6-methoxy-4-phenylquinoline; M.P. 131 to 132° C.
3-amino-6,7-dimethoxy-4-phenylquinoline; M.P. 176 to 177° C.
3,6-diamino-4-phenylquinoline– M.P. 218 to 219° C.

Example 1

A mixture of 10 volume parts of acetic anhydride and 3.8 parts of 3-amino-6-chloro-4-phenylquinoline is heated on a boiling water bath to make a solution and it is kept standing at room temperature. After cooling, 40 volume parts boiling water is added to the mixture and the resulting crystals are collected by filtration. Recrystallization from acetone-benzene gives 4.2 parts of 3-acetamido-6-chloro-4-phenylquinoline as colorless prisms melting at 200 to 202° C.

Example 2

A solution of 5 parts of 3-amino-6-chloro-4-phenylquinoline in 20 volume parts of formic acid is refluxed for one hour. After evaporation of the solvent, about 150 volume parts of water is added to the residue and the resulting crystals are collected by filtration. Recrystallization from acetone-ethyl ether yields 6-chloro - 3 - formamido-4-phenylquinoline as colorless plates melting at 149 to 150° C.

Example 3

To a solution of 0.26 part of 3-amino-6-chloro-4-phenylquinoline in 2 volume parts of pyridine is added 0.16 volume part of isovaleric acid chloride with stirring and ice-cooling, and the whole mixture is stirred for further 4 hours. To the reaction mixture is added 10 volume parts of water, and the resulting crystals are collected by filtration.
Recrystallization from isopropyl ether gives 6-chloro-3-isovaleroylamido - 4 - phenylquinoline as colorless plates melting at 123 to 125° C.

Example 4

To a solution of 0.26 part of 3-amino-6-chloro-4-phenylquinoline in 2 volume parts of chloroform and 0.4 volume part of triethylamine is added dropwise 0.3 volume part of phenacetyl chloride under stirring and cooling with ice, and the whole mixture is stirred for further 2 hours. The chloroform layer is washed with aqueous sodium bicarbonate solution and with water, then dried over sodium sulfate. After evaporation of the solvent, the residual crystals are recrystallized from acetone-isopropyl ether to give 6-chloro - 4 - phenyl - 3 - phenylacetamidoquinoline as colorless needless melting at 165 to 167° C.

Example 5

To a solution of 0.26 part of 3-amino-6-chloro-4-phenylquinoline in 2 volume parts of pyridine is added 1 volume part of trifluoroacetic anhydride under stirring and cooling with ice, and the whole mixture is stirred for further 30 minutes. Water is added to the reaction mixture and the resulting crystals are collected by filtration, and recrystallized from isopropyl ether to give 6-chloro-4-phenyl - 3 - trifluoroacetamidoquinoline as colorless needles melting at 174 to 175° C.

Example 6

A mixture of 0.26 part of 3-amino-6-chloro-4-phenylquinoline, 2 volume parts of acetic anhydride and 0.2 part of anhydrous sodium acetate is refluxed for 10 hours. After completion of the reaction, 20 volume parts of boiling water is added to the mixture and crystals are collected by filtration. Recrystallization from ethyl alcohol gives 6-chloro-3-diacetylamino-4-phenylquinoline as brown plates melting at 165 to 166.5° C.

After a similar manner to the above examples, the following compounds are produced:

3-acetamido-6-nitro-4-phenylquinoline; yellow plates, M.P. 203 to 204° C.
3-diacetylamino-6-nitro-4-phenylquinoline; yellow-brown plates, M.P. 214 to 217° C.
3-acetamido-6-methyl-4-phenylquinoline; colorless plates, M.P. 192° C.
3-acetamido-6-chloro-4-(2-chlorophenyl)quinoline; colorless prisms, M.P. 201 to 202° C.
3-acetamido-6-chloro-4-(4-methoxyphenyl)quinoline; colorless needles, M.P. 194° C.
3-acetamido-6-bromo-4-phenylquinoline; pale yellow prisms, M.P. 208 to 209° C.
3-acetamido-6-iodo-4-phenylquinoline; yellow flakes, M.P. 213 to 214° C.
3-acetamido-6-methoxy-4-phenylquinoline; colorless prisms, M.P. 155 to 156° C.
3-acetamido-6,7-dimethoxy-4-phenylquinoline; colorless needles, M.P. 202 to 203° C.
6-chloro-3-propionamido-4-phenylquinoline; colorless needles, M.P. 143 to 144° C.
6-chloro-3-palmitoylamido-4-phenylquinoline; colorless needles, M.P. 98 to 99° C.
6-chloro-3-(p-chlorophenylacetamido)-4-phenylquinoline; colorless needles, M.P. 153 to 154° C.
6-chloro-3-chloroacetamido-4-phenylquinoline; colorless needles, M.P. 156 to 157° C.
6-chloro-3-dichloroacetamido-4-phenylquinoline; colorless prisms, M.P. 135 to 136° C.
6-chloro-4-phenyl-3-trichloroacetamidoquinoline; colorless needles, M.P. 137 to 138° C.

Example 7

To a solution of 15.3 parts of 3-acetamido-6-nitro-4-phenylquinoline in a mixture of 180 volume parts of acetic acid and 40 volume parts of water, 10.7 parts of zinc powder is added portionwise with stirring, whereby exothermic reaction takes place. After stirring for further one hour, the mixture is concentrated under reduced pressure and made alkaline by addition of an aqueous sodium hydroxide solution. Resulting mixture is extracted with ethyl acetate. The organic layer is washed with water and dried over sodium sulfate. Evaporation of the solvent and recrystallization of the residue from methanol gives 3-acetamido-6-amino-4-phenylquinoline as pale brown needles melting at 198 to 199° C.

Example 8

Acetylation of 3-acetamido-6-amino-4-phenylquinoline with acetic anhydride in a usual manner yields 3,6-diacetamido-4-phenylquinoline as crystals. Recrystallization from dimethylformamide-water gives pale orange prisms melting at 273 to 274° C.

Example 9

Acetylation of 3,6-diamino-4-phenylquinoline with acetic anhydride gives 3,6-diacetamido-4-phenylquinoline which is identical with the product prepared in Example 8.

What is claimed is:
1. A compound of the formula

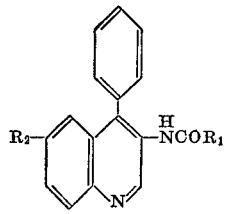

wherein $R_1$ is methyl, ethyl or methyl substituted by 1 or 2 identical halogen atoms and $R_2$ is halogen, methyl, methoxy, amino or acetamido.

2. A compound as claimed in claim 1, wherein the compound is 3-acetamido-6-chloro-4-phenylquinoline.

3. A compound as claimed in claim 1, wherein the compound is 3-acetamido-6-methyl-4-phenylquinoline.

4. A compound as claimed in claim 1, wherein the compound is 3-acetamido-6-bromo-4-phenylquinoline.

5. A compound as claimed in claim 1, wherein the compound is 3-acetamido-6-iodo-4-phenylquinoline.

6. A compound as claimed in claim 1, wherein the compound is 3-acetamido-6-methoxy-4-phenylquinoline.

7. A compound as claimed in claim 1, wherein the compound is 6-chloro-3-propionamido-4-phenylquinoline.

8. A compound as claimed in claim 1, wherein the compound is 6-chloro-3-chloroacetamido - 4 - phenylquinoline.

9. A compound as claimed in claim 1, wherein the compound is 6-chloro-3-dichloroacetamido-4-phenylquinoline.

10. A compound as claimed in claim 1, wherein the compound is 3-acetamido-6-amino-4-phenylquinoline.

11. A compound as claimed in claim 1, wherein the compound is 3,6-diacetamido-4-phenylquinoline.

References Cited

UNITED STATES PATENTS 2,966,489   12/1960   Hepworth _____ 260—287 R

OTHER REFERENCES

Schofield et al., Jour. Chem. Soc., vol. 1951, p. 2992–5 (1951).

Ockenden and Schofield, Jour. Chem. Soc., vol. 1953, p. 3914–9 (1953).

Ainley, Chem. Abstr., vol. 52, Col. 20208d, 1958, abstracting, Br. 794,043.

DONALD G. DAUS, Primary Examiner

U.S. Cl. X.R.

260—283.5 Y, 288 R; 424—258